(12) United States Patent
Wang et al.

(10) Patent No.: US 10,126,885 B2
(45) Date of Patent: Nov. 13, 2018

(54) CAPACITIVE TOUCH PANEL AND TOUCH POSITION CALCULATION METHOD THEREOF

(71) Applicant: HYCON TECHNOLOGY CORP., Taipei (TW)

(72) Inventors: Hui-Min Wang, Taipei (TW); Yu-Jen Wang, Taipei (TW)

(73) Assignee: Hycon Technology Corp., Taipei (TW)

( * ) Notice: Subject to any disclaimer, the term of this patent is extended or adjusted under 35 U.S.C. 154(b) by 802 days.

(21) Appl. No.: 14/589,401

(22) Filed: Jan. 5, 2015

(65) Prior Publication Data

US 2016/0195954 A1 Jul. 7, 2016

(51) Int. Cl.
*G06F 3/044* (2006.01)
(52) U.S. Cl.
CPC .................. *G06F 3/044* (2013.01)
(58) Field of Classification Search
CPC ....................................................... G06F 3/044
See application file for complete search history.

(56) References Cited

U.S. PATENT DOCUMENTS

| 8,502,796 | B1 * | 8/2013 | Yilmaz | G06F 3/044 |
| | | | | 178/18.06 |
| 9,207,814 | B2 * | 12/2015 | Yilmaz | G06F 3/044 |
| 2012/0227259 | A1 * | 9/2012 | Badaye | G06F 3/044 |
| | | | | 29/846 |
| 2014/0313163 | A1 * | 10/2014 | Coni | G06F 3/0416 |
| | | | | 345/174 |
| 2015/0077383 | A1 * | 3/2015 | Kang | G06F 3/044 |
| | | | | 345/174 |

FOREIGN PATENT DOCUMENTS

TW 201120704 6/2011

* cited by examiner

*Primary Examiner* — Viet Pham
(74) *Attorney, Agent, or Firm* — Che-Yang Chen; Law Offices of Scott Warmuth

(57) ABSTRACT

Disclosed is a capacitive touch panel having a circuitous conductor pattern structure. The capacitive touch panel contains a number of first axial conductor assemblies and a number of second axial conductor assemblies, wherein each second axial conductor assembly includes a number of second axial conductor cells which are composed of a number of bar shape figures with accordion shape or wave shape edges. Electrical fields and induced capacitors are generated between adjacent axial conductor assemblies with different directions when giving control signals. Then the touched position is detected. Circuitous conductor pattern increases the region of the first axial conductor assembly and the inducing range of electrical field, thus the amount of the axial conductor assemblies and conduction lines can be reduced.

10 Claims, 3 Drawing Sheets

CAPACITIVE TOUCH PANEL AND TOUCH POSITION CALCULATION METHOD THEREOF

FIELD OF THE INVENTION

The present invention relates to a structure design of a touch panel. More particularly, the present invention relates to a capacitive touch panel having a conductor pattern structure and a touch position calculation method thereof. Touch panels have been applied in large numbers to products of home appliances, communications, electronic information etc., such as wildly commercial Personal Digital Assistant (PDA), every home appliances and gaming input interfaces. With integration of touch panels and displays, it is available for users to use fingers or a stylus to select or input what they want to act according to functional options on a displayed screen of a PDA, a home appliance or a gaming input interface. Thus, it is used as a query tool for public systems so as to provide an operating system which has convenient effects.

BACKGROUND OF THE INVENTION

The known touch panel is made by forming an inducing area on one surface of the substrate. Touch control is available in the inducing area by inducing human fingers or signals from a stylus. Most materials used in the inducing area are transparent conductive film (e.g. Indium Tin Oxide ITO). It makes users to perform touch control in operation by touching the conductive film where corresponds to a screen on the display.

Currently, commonly applied principles for touch control are resistive type, capacitive induced type, infrared induced type, electromagnetic induced type, sonic induced type, etc. Operation of the capacitive induced type touch panel is to utilize changes of capacitance generated by combination of static electricity arranged between transparent electrodes and human body. Coordinates of the touched position can be detected by the generated induced current. Since the capacitive induced type touch panel has better advantages in the field of transmittance, hardness, accuracy, response time, lifecycle of touch, operating temperature, and initiating force, therefore, it is wildly adopted.

In order to detect a position on the touch panel where the user uses a finger or a stylus to touch, a number of induced capacitance type touch inducing techniques have been developed in the industry. For example, in the U.S. Patent Publication No. 2012/0256642, a single-layered touch inducing system is disclosed and can be used to detect a touch position on a touch inducing surface. The single-layered touch inducing system includes conductor assemblies in two axes. The two axes are perpendicular to each other. The first axial conductor assemblies are composed of a number of first conductor cells linked to each other. The second axial conductor assemblies are composed of a number of second axial conductor cells linked by wires. A proper distance is reserved between adjacent conductor cells in different axes. Each conductor assembly is electrically linked to a corresponding wire, further linking to a control circuit. The control circuit causes an induced electric field in an adjacent range near adjacent conductor cells in different axes by providing signals to the two conductor assemblies in different axes through wires. If users touch the adjacent range, an equivalent capacitance value of the induced electric field will be changed. A touch position of the user can be reckoned by the amount of change of the capacitance value. A shape of the conductor cell is like a letter E or a ring.

In the R.O.C. Patent No. 1457813, a single-layered capacitive touch panel is disclosed. Comparing with the U.S. Patent Publication No. 012/0256642, they both utilize induced electric field in the adjacent regions between different axis conductor cells and reckon a touch position of the user by the amount of changes of the capacitance value. The difference is that the present patent uses a tooth structure for the adjacent regions between different axis conductor cells.

In the U.S. Pat. No. 8,502,796, a capacitive touch panel is disclosed. A feature of the capacitive induced layer is that the second axial conductor cell is composed of bar shape figures in different lengths, so that a distribution of the induced electric field has different strengths. The distribution of the induced electric field in a central region uses longer bar shape figures which leads to a stronger electric field. The distribution of the induced electric field in the peripheral regions uses shorter bar shape figures which leads to a weaker electric field. Because the electric field has strength differences, change amount of the induced capacitance values are different when users touch the central electric field and the peripheral electric field, respectively. Hence, the induced range of the electric field can be increased and the touch position can be reckoned. The structure has an effect to improve the distribution of the electric field and increase sensitivity of induction and saves the number of used wires. Meanwhile, complexity of the control circuit can be reduced.

In the R.O.C. Utility Patent No. M447541, a capacitive touch panel is disclosed. A feature of the capacitive induced layer is that the conductor cells and wires are not formed in non-linear geometry. The transmittance of the conductor cells and wires on the touch panel can be improved, further improving the display effect of the display panel.

Reviewing the patents and applications mentioned above, the U.S. Patent Publication No. 2012/0256642, the R.O.C. Invention Patent No. 1457813 and the R.O.C. Utility Patent No. M447541 have disclosed many geometric shapes for every conductor cells. However, the induced electric fields are not distinguished according to the strength. Therefore, the size of the conductor cells is limited by the touch area of the user. The conductor cells in the U.S. Pat. No. 8,502,796 are composed of bar shape figures in different lengths, causing a distribution of different strengths for the induced electric field. Thus, area of the conductor cells and the induced range of the electric field can be increased and the touch position can be reckoned. However, the distribution of the electric field is asymmetric. Errors will occur if the touch position is calculated by a general rule while complexity and calculating time of the control circuit will increase if special calculation is adopted.

Hence, the induced range of the electric field needs to be increased and the techniques for symmetric distribution of the electric field are required for the induced layer of the touch panel. Not only the induced range of the conductor cells is increased, but the amount of wires is reduced. Meanwhile, increase of complexity and calculating time of the control circuit can be avoided.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

The main purpose of the present invention is to provide a single-layered capacitive touch panel causing a uniform distribution of induced electric field. The single-layered capacitive touch panel includes conductor assemblies in two axes. The two axes are perpendicular to each other. The first axial conductor assembly is formed by a number of linked first conductor cells. The second axial conductor assembly is composed of a number of wiredly linked second axial conductor cells. A proper distance is kept between the conductor cells in different axes. Each conductor assembly is electrically linked to corresponding wire, further linking a control circuit. The control circuit provides signals to two conductor assemblies in different axes through wires, so that an induced electric field is generated in adjacent ranges of the adjacent conductor cells in different axes. The conductor cell is composed of bar shape figures in different lengths. Edges of the conductor cell are formed to be accordion shape or wave shape. Therefore, the induced electric field has a distribution of different strengths. The induced range increases. Meanwhile, the distribution of the induced electric field becomes more uniformly. Calculation error caused by asymmetry of the induced electric field is reduced. A precise touch position can be reckoned by the control circuit.

Graphs of the conductor cell with a distribution of the induced electric field are disclosed by the present invention. Basically, the conductor cell is composed of bar shape figures in different lengths. Edges in the geometric center of the conductor cell are formed to be accordion shape or wave shape. Thus, a center of the induced electric field is located in the geometric center of the conductor cell. Therefore, the induced electric field has a distribution of different strengths. Meanwhile, the distribution of the induced electric field is symmetrical. Calculation error caused by asymmetry of the induced electric field is reduced. A precise touch position can be reckoned by the control circuit.

A corresponding method to calculate a touch position according to the conductor cell is also disclosed. The method includes reckoning coordinates of a center of the electric file according to the graphs of the conductor cell; and then calculating a correct touch position according to a change amount of the induced capacitance value in each induced electric field and weighted results of the plane coordinates of the center of the electric field.

Preferably, a capacitive touch panel according to the present invention includes: a substrate, having a circuitous conductor pattern structure formed on a surface thereof; a number of first axial conductor assemblies, arranged on the surface of the substrate along a first axis; a number of second axial conductor assemblies, each second axial conductor assembly including a number of second axial conductor cells, arranged on the surface of the substrate along a second axial, wherein the second axial conductor cell is formed by linking a number of bar shape figures with accordion shape or wave shape edges; and a number of second axial wires, linking to edges of the substrate surface from each second axial conductor cell, respectively.

Preferably, a capacitive touch panel according to the present invention includes: a substrate, having a circuitous conductor pattern structure formed on a surface thereof; a number of first axial conductor assemblies, arranged on the surface of the substrate along a first axis; a number of second axial conductor assemblies, each second axial conductor assembly including a number of second axial conductor cells, arranged on the surface of the substrate along a second axial, wherein the second axial conductor cell is formed by linking a number of bar shape figures with circuitous lines distributed on partial regions to increase adjacent regions to the first axial conductor assemblies; and a number of second axial wires, linking to edges of the substrate surface from each second axial conductor cell, respectively.

Preferably, features of edges of the second axial conductor cell with accordion shape or wave shape lines, partial regions with circuitous lines distributed, or keeping different distances from the first axial conductor assemblies can be applied with one another.

Preferably, the capacitive touch panel further includes a number of floating induced units, each floating induced unit arranged between the first axial conductor assembly and the second axial conductor cell.

Preferably, shapes of adjacent first axial conductor assemblies are the same or linearly symmetrical; shapes of adjacent second axial conductor cells in the same second axial conductor assembly are the same or linearly symmetrical.

Preferably, a distance between the first axial conductor assembly and adjacent second axial conductor cell is 0.3 mm~0.5 mm.

Preferably, a width of the first axial conductor assembly and a width of the second axial conductor cell are 0.2 mm~0.6 mm.

Preferably, turning angles of the accordion shape edge in the first axial conductor assemblies and the second axial conductor cell range from 15 degrees to 25 degrees.

Preferably, a width and a spacing of the second axial wire are 0.02~0.05 mm.

Preferably, a width of a trace region of the second axial wire is 1.5~2.2 mm.

Preferably, a touch position calculation method is provided in the present invention. The method includes the steps of: equidistantly distributing a number sets of basic touch coordinates with equal distance, measuring an induced result in each basic touch coordinate, and making an induce value table based on the measured induced results; and comparing induced results with the values in the induce value table, reckoning at least one basic touch coordinate close to one touch position, and calculating a precise touch position according to the induced results and the values in the induce value table to detect a user's touch position.

DETAILED DESCRIPTION OF THE PREFERRED EMBODIMENTS

The present invention will now be described more specifically with reference to the following embodiments. It should be noticed that the embodiment of the present invention described below is only for the purpose of description. It is not intent that the present invention has been described in details or limited by the form of disclosure.

Figure 1:
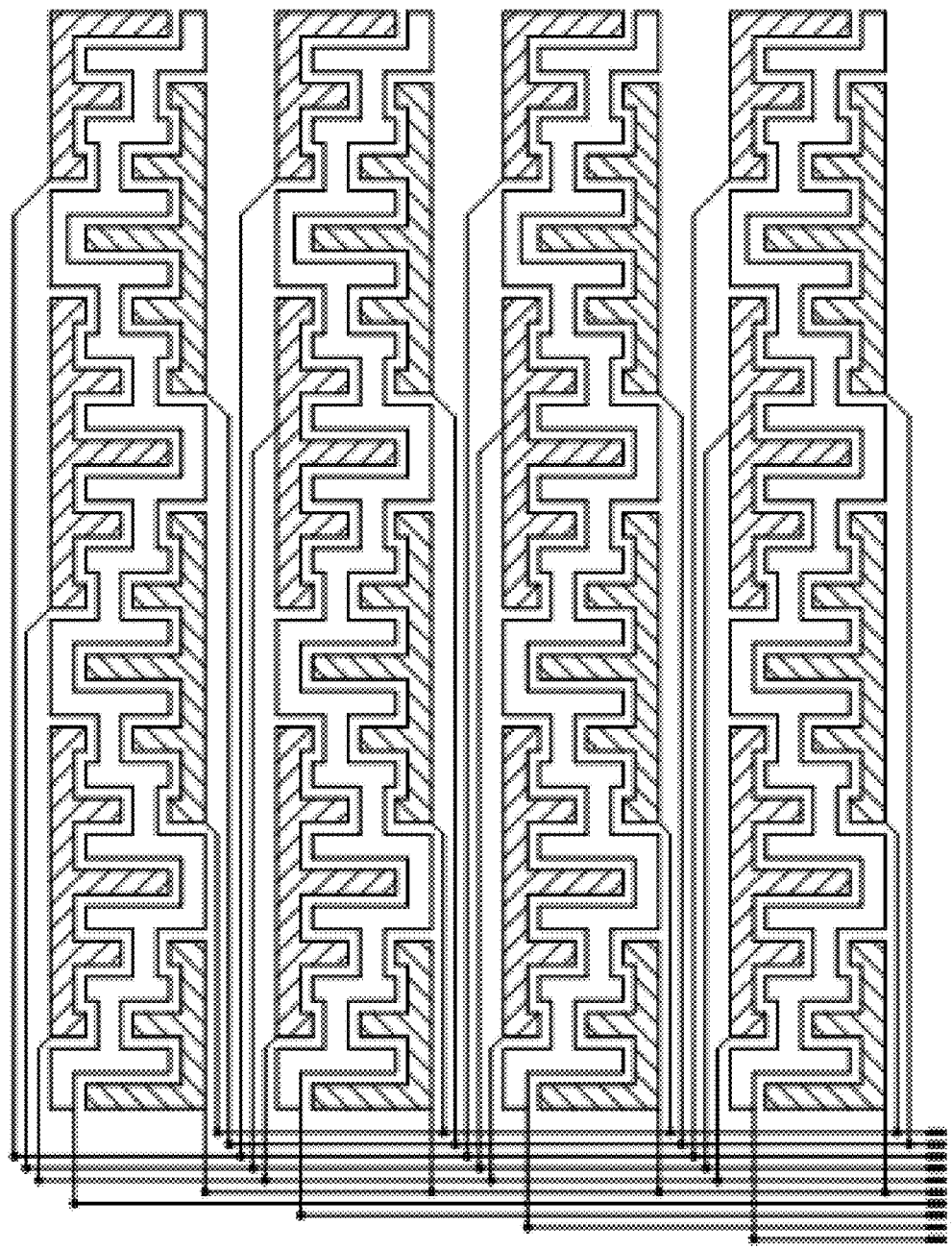
FIG. 1 illustrates conductor pattern a structure of a conventional capacitive touch panel.
Figure 2:
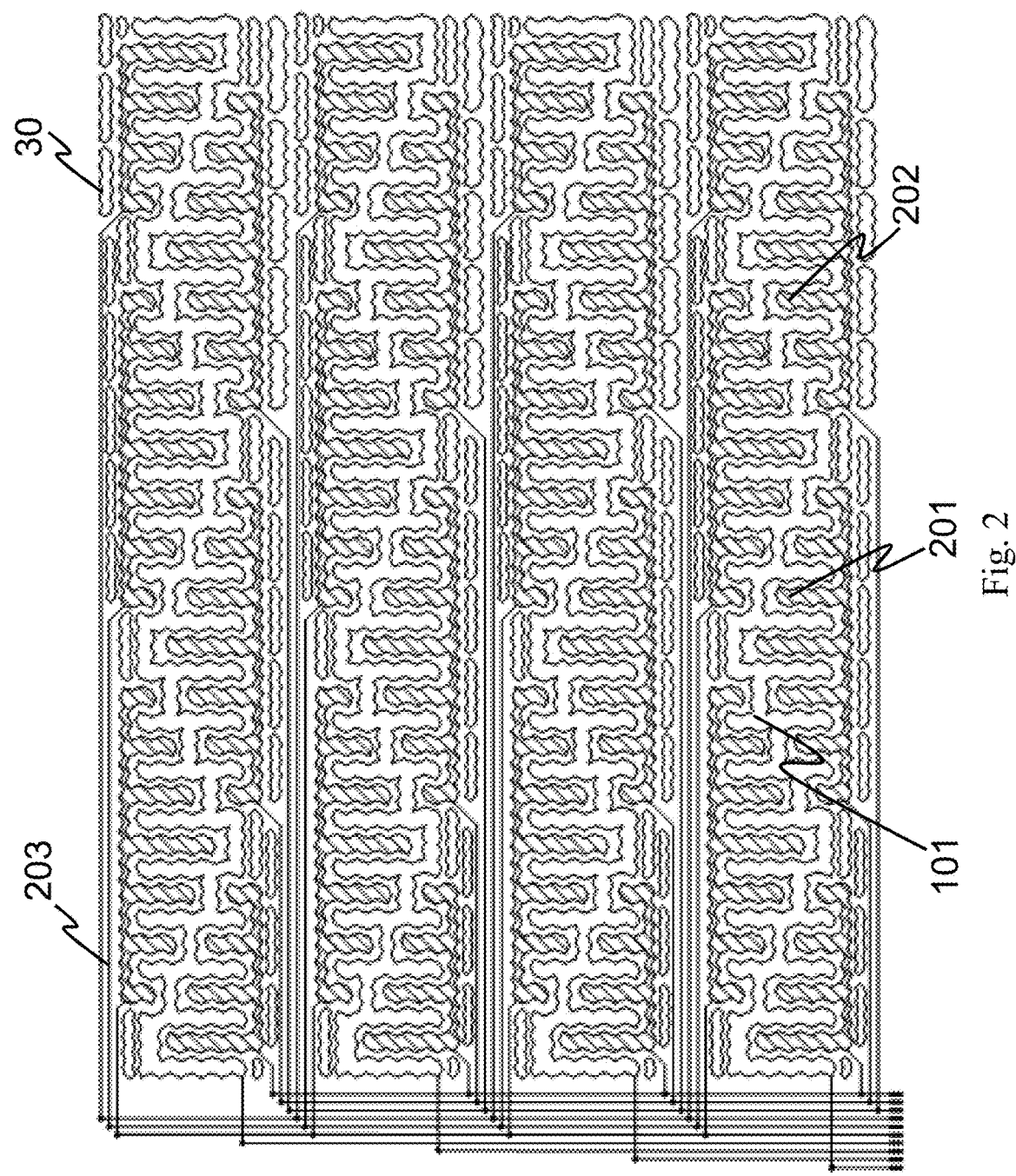
FIG. 2 illustrates a conductor pattern structure of a single-layered capacitive touch panel according to a first embodiment of the present invention, wherein the second axial conductor cell is formed by linking a number of bar shape figures. Edges are in accordion shape or wave shape.

The capacitive touch panel of the present invention includes a substrate, having a circuitous conductor pattern structure formed on one surface of the substrate; a number of first axial conductor assemblies 101, arranged on the surface of the substrate along a first axis; a number of second axial conductor assemblies 201, each second axial conductor assembly 201 including a number of second axial conductor cells 202, arranged on the surface of the substrate along a second axial; and a number of second axial wire 203, linking to edges of the substrate surface from each second axial conductor cell 202, respectively. The second axial conductor cell 202 is formed by linking a number of bar shape figures. Edges of the second axial conductor cell 202 are accordion shape wave shape. Partial regions of second axial conductor cell 202 have circuitous lines distributed, to increase adjacent regions to the first axial conductor assemblies 101. Or, the partial regions of the second axial conductor cell 202 can keep different distances from the first axial conductor assemblies 101. Next, please refer to FIG. 2. A conductor pattern structure of a single-layered capacitive touch panel according to a first embodiment of the present invention is provided. As shown in FIG. 2, the conductor pattern structure includes 6 horizontal first axial conductor assemblies 101 and 10 vertical second axial conductor assemblies 201. Each second axial conductor assemblies 201 include 6 second axial conductor cells 202 and second axial wires 203. The leftmost and rightmost second axial conductor cells 202 are formed by linking 4 vertical bar shape figures with different lengths. The outermost bar shape figure is the longest one. Lengths of the rest bar shape figures reduce sequentially to the inner side. The rest second axial conductor cells 202 are formed by linking 7 vertical bar shape figures with different lengths. The middle bar shape figure is the longest one. Lengths of the rest bar shape figures reduce sequentially to two sides. Edges of the second axial conductor cell 202 are accordion shape. Second axial conductor cells 202 in the same second axial conductor assembly 201 are linked to edges of the touch board by wires, respectively, further linking to the first axial conductor assemblies 101 distributed horizontally in gaps between the second axial conductor cells 202. The edge is accordion shape and keeps a proper distance from the second axial conductor cell 202. When users touch the longer bar shape figures, induction of the induced electric field is larger and a change amount of the equivalent capacitance value is larger. When users touch the shorter bar shape figures, induction of the induced electric field is smaller and a change amount of the equivalent capacitance value is smaller. The touch positions of users can be reckoned by this way.

In the present embodiment, shapes of adjacent first axial conductor assemblies 101 are the same or linearly symmetrical. Shapes of adjacent second axial conductor cell 202 in the same second axial conductor assembly 201 are the same or linearly symmetrical, too.

Comparing the present embodiment with the prior arts, the main difference is the edges of the conductor cell are appended with accordion shape lines. The second axial conductor cell 202 in the prior arts has an asymmetric pattern in the upper and bottom of the graph, causing asymmetric distribution of induced electric field. Errors occur if a touch position is obtained based on this. After the accordion shape lines are added to the edges of the conductor cell, distribution of the electric field becomes more uniform. Symmetry of the induced electric field increases. Hence, a correct touch position can be reckoned.

Meanwhile, the capacitive touch panel in the present embodiment can further includes a number of floating induced unit 30. Each floating induced unit 30 is arranged between the first axial conductor assembly 101 and the second axial conductor cell 202.

Figure 3:
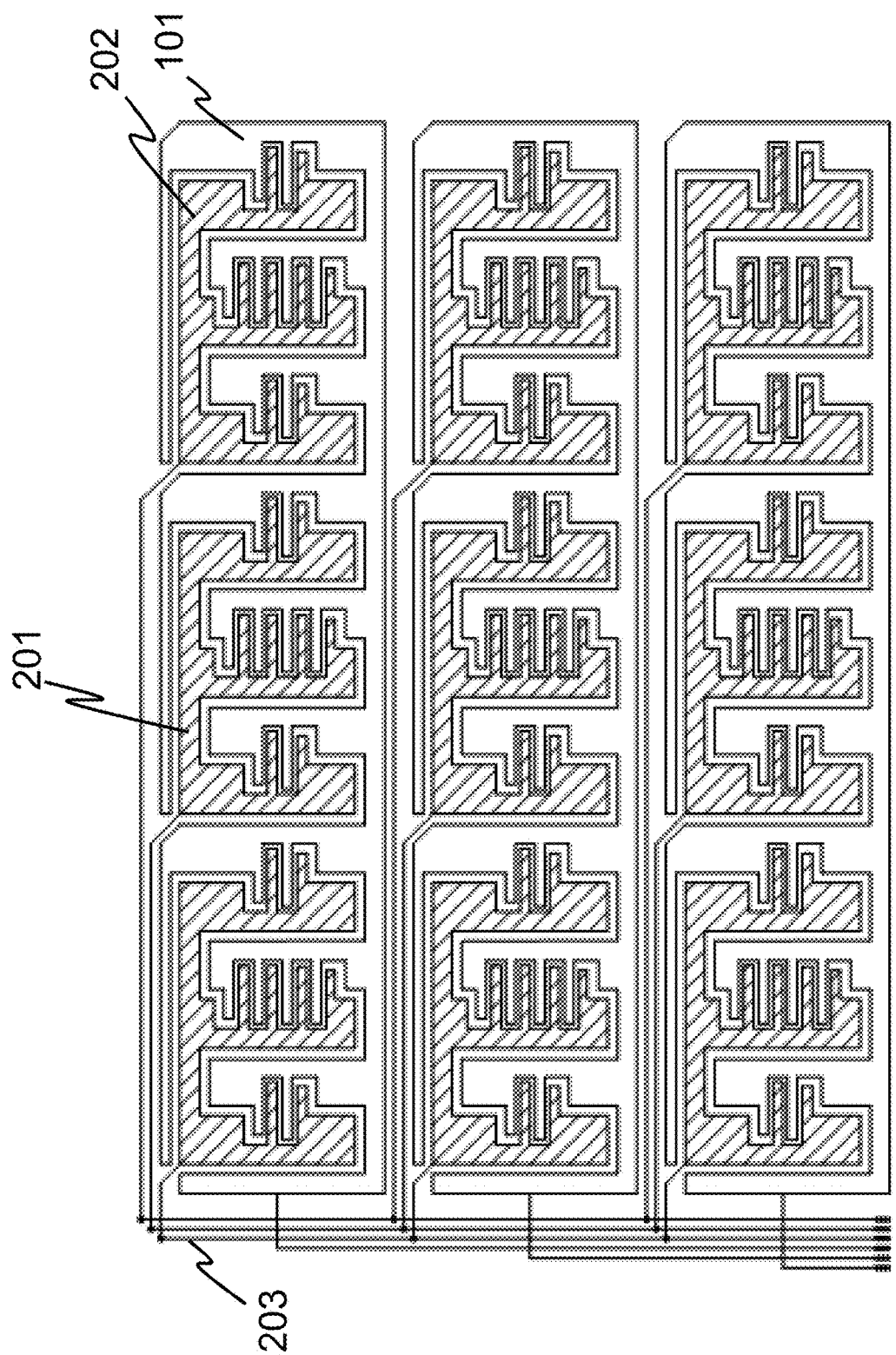
FIG. 3 illustrates a conductor pattern structure of a single-layered capacitive touch panel according to a second embodiment of the present invention, wherein the second axial conductor cell is formed by a number of bar shape figures. Edges are in accordion shape or wave shape and there are circuitous lines distributed in partial regions, to increase adjacent regions to the first axial conductor assembly.

Please see FIG. 3 for the second the present embodiment of the present invention. It shows a conductor pattern structure of a single-layered induced capacitive touch panel. The touch graph includes 3 horizontal first axial conductor assemblies 101 and 3 vertical second axial conductor assemblies 201. Each of the second axial conductor assemblies 201 includes 3 second axial conductor cells 202. The second axial conductor cell 202 basically is in a shape of latter E and circuitous graphs are added in the geometric center. Hence, distribution of the electric field is enhanced. A few circuitous graphs are added to two sides to adjust the distribution of the electric field. Second axial conductor cell 202 in the same second axial conductor assembly 201 are linked to edges of the surface of the touch board by wires, further linking to each other. The first axial conductor assemblies 101 are distributed horizontally in gaps between the second axial conductor cells 202. The edge is appended with accordion shape lines and keeps proper distances from the second axial conductor cell 202. When users touch the more circuitous graphs, induction of the induced electric field is larger and a change amount of the equivalent capacitance value is larger. When users touch the less circuitous graphs, induction of the induced electric field is smaller and a change amount of the equivalent capacitance value is smaller. The touch positions of users can be reckoned by this way.

In the present embodiment, shapes of the adjacent first axial conductor assemblies 101 are the same or linearly symmetrical. Shapes of adjacent second axial conductor cell 202 in the same second axial conductor assembly 201 are the same or linearly symmetrical, too.

Comparing the present embodiment with the prior arts, the main difference is the center of the second axial conductor cell 202 is added with accordion shape lines so that a center of the induced electric field is adjusted to the center of the conductor cell, causing a symmetric distribution for the induced electric field. Hence, a correct touch position can be reckoned.

Furthermore, the capacitive touch panel in the present embodiment can further include a number of floating induced unit 30. Each floating induced unit 30 is arranged between the first axial conductor assembly 101 and the second axial conductor cell 202.

In the present embodiments of the present invention, a width of the first axial conductor assembly 101 and a width of the second axial conductor cell 202 are 0.2~0.6 mm. A distance between the first axial conductor assembly 101 and the second axial conductor cell 202 is 0.3~0.5 mm. A width of a trace region of the second axial wire 203 is 1.5~2.2 mm. Turning angles of the accordion shape edge in the first axial conductor assembly 101, the second axial conductor cell 202 and the second axial wire 203 range from 15 degrees to 25 degrees. A width and a spacing of the second axial wire are 0.02~0.05 mm.

A touch position calculation method for a capacitive touch panel is also disclosed in the present invention. Take the graphs in FIG. 2 for example. Since the graph of the second axial conductor cell 202 is asymmetric, distribution of the generated 4×6 induced electric fields is also asymmetric. If a touch position is calculated directly from the induced results, errors will occur. Therefore, before detecting the touch position of the user, equidistantly distribute 8×12 sets of basic touch coordinates with equal distance, measure an induced result in each basic touch coordinate, and make an induce value table based on the measured induced results. When detecting the touch position of the user, comparing induced results with the values in the induce value table, it is able to reckon a basic touch coordinate closest to the touch position. It is possible to reckon a number of basic touch coordinates closer to the touch position. Then, calculate a precise touch position with weights according to the induced results and the values in the induce value table to detect a user's touch position.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A capacitive touch panel, comprising:
    a substrate, having a circuitous conductor pattern structure formed on a surface thereof;
    a plurality of first axial conductor assemblies, arranged on the surface of the substrate along a first axis;
    a plurality of second axial conductor assemblies, each second axial conductor assembly comprising a plurality of second axial conductor cells, arranged on the surface of the substrate along a second axial, wherein the second axial conductor cell is formed by linking a plurality of bar shape figures, each of the plurality of bar shape figures have accordion wave shape edges formed between the first axial conductor assemblies and the second axial conductor cell; and
    a plurality of second axial wires, linking to edges of the substrate surface from each second axial conductor cell, respectively.

2. The capacitive touch panel according to claim 1, wherein the partial regions of the second axial conductor cell have circuitous lines distributed, to increase adjacent regions to the first axial conductor assemblies.

3. The capacitive touch panel according to claim 1, wherein the partial regions of the second axial conductor cell keep different distances from the first axial conductor assemblies.

4. The capacitive touch panel according to claim 1, further comprising a plurality of floating induced units, each floating induced unit arranged between the first axial conductor assembly and the second axial conductor cell.

5. The capacitive touch panel according to claim 1, wherein shapes of adjacent first axial conductor assemblies are the same or linearly symmetrical; shapes of adjacent second axial conductor cells in the same second axial conductor assembly are the same or linearly symmetrical.

6. The capacitive touch panel according to claim 1, wherein a distance between the first axial conductor assembly and adjacent second axial conductor cell is 0.3 mm~0.5 mm.

7. The capacitive touch panel according to claim 1, wherein a width of the first axial conductor assembly and a width of the second axial conductor cell are 0.2 mm~0.6 mm.

8. The capacitive touch panel according to claim 1, wherein turning angles of the accordion shape edge in the first axial conductor assemblies and the second axial conductor cell range from 15 degrees to 25 degrees.

9. The capacitive touch panel according to claim 1, wherein a width and a spacing of the second axial wire are 0.02~0.05 mm.

10. The capacitive touch panel according to claim 1, wherein a width of a trace region of the second axial wire is 1.5~2.2 mm.

* * * * *